United States Patent
Gilson et al.

(10) Patent No.: US 12,501,112 B2
(45) Date of Patent: Dec. 16, 2025

(54) PROVIDING RELATED EPISODE CONTENT

(71) Applicant: Comcast Cable Communications, LLC, Philadelphia, PA (US)

(72) Inventors: Ross Gilson, Philadelphia, PA (US); Michael Sallas, Radnor, PA (US); Chris Bastian, Glenmoore, PA (US); Slade Mitchell, Chester Springs, PA (US); Amit Garg, Delran, NJ (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/355,169

(22) Filed: Jul. 19, 2023

(65) Prior Publication Data
US 2024/0137613 A1 Apr. 25, 2024
US 2024/0236421 A9 Jul. 11, 2024

Related U.S. Application Data

(63) Continuation of application No. 14/567,577, filed on Dec. 11, 2014, now Pat. No. 11,750,886.

(51) Int. Cl.
*H04N 21/454* (2011.01)
*H04N 21/442* (2011.01)
*H04N 21/81* (2011.01)
*H04N 21/8549* (2011.01)

(52) U.S. Cl.
CPC ..... *H04N 21/454* (2013.01); *H04N 21/44204* (2013.01); *H04N 21/44226* (2020.08); *H04N 21/812* (2013.01); *H04N 21/8133* (2013.01); *H04N 21/8549* (2013.01)

(58) Field of Classification Search
CPC .......... H04N 21/454; H04N 21/44226; H04N 21/44204; H04N 21/812; H04N 21/8133; H04N 21/8549
See application file for complete search history.

(56) References Cited

U.S. PATENT DOCUMENTS

| | | | |
|---|---|---|---|
| 8,302,127 | B2 | 10/2012 | Klarfeld et al. |
| 8,351,933 | B2 | 1/2013 | Ramer et al. |
| 2009/0055884 | A1 | 2/2009 | Park et al. |
| 2009/0113466 | A1 | 4/2009 | Amitay |
| 2009/0235308 | A1 | 9/2009 | Ehlers et al. |
| 2010/0192187 | A1 | 7/2010 | Toebes et al. |
| 2010/0332560 | A1 | 12/2010 | Gerbasi, III |

(Continued)

FOREIGN PATENT DOCUMENTS

WO 2013085524 A1 6/2013

*Primary Examiner* — Randy A Flynn
(74) *Attorney, Agent, or Firm* — Banner & Witcoff, Ltd.

(57) ABSTRACT

Methods and systems are disclosed for tailoring related episode content within an episode, thereby improving a user's experience. In response to receiving a request for an episode, several factors may be considered when determining how much of the related episode content to provide. These factors may include information such as whether the user has already viewed a previous episode, the elapsed time since viewing the previous episode and a user preference. Related episode content may be modified to remove portions previously viewed by a user, depending on factors such as the elapsed time and a user preference.

31 Claims, 6 Drawing Sheets

(56) References Cited

U.S. PATENT DOCUMENTS

| | | | |
|---|---|---|---|
| 2011/0107220 A1* | 5/2011 | Perlman | H04N 21/2381 |
| | | | 715/720 |
| 2012/0020651 A1* | 1/2012 | Gilson | H04N 21/235 |
| | | | 386/296 |
| 2012/0079517 A1 | 3/2012 | Yarvis et al. | |
| 2013/0297599 A1 | 11/2013 | Henshall | |
| 2014/0075312 A1 | 3/2014 | Dingsor et al. | |
| 2014/0349750 A1 | 11/2014 | Thompson et al. | |
| 2015/0113153 A1 | 4/2015 | Lin | |
| 2015/0229977 A1* | 8/2015 | Kanigsberg | H04N 21/8549 |
| | | | 725/10 |
| 2015/0382052 A1 | 12/2015 | Pearlman et al. | |

* cited by examiner

PROVIDING RELATED EPISODE CONTENT

CROSS-REFERENCE TO RELATED APPLICATIONS

This application is a continuation of and claims priority to U.S. patent application Ser. No. 14/567,577, filed Dec. 11, 2014, which is hereby incorporated by reference in its entirety.

BACKGROUND

Television programming often comprises a series of episodes where a story is told over several episodes. An episode is often made available on a weekly basis. A series of episodes may be divided into a yearly set and this may be referred to as a season. A user may watch an episode at the same time each week to keep up with the story. A user may be able to record episodes, for example on a digital video recorder (DVR), in order to view the episodes later, at a time of the user's choosing. A user may record a number of episodes, in some cases, even a whole season, and later watch the episodes in a back-to-back manner, perhaps watching a number of episodes in a single sitting. In addition, episodes may be provided on demand by a content server, where a user may select to watch particular episodes. Here, again, a user may choose to watch a number of episodes in a single sitting. A typical episode may be composed of several video segments. For example, an episode may have a program content segment and several related content segments. Related episode content segments include segments other than the program content segment. For example, an episode may have a recap sequence depicting what happened in previous episodes. An episode may have a trailer, to inform a user about the next episode. There may be other related content, such as opening or closing credit sequences or a title sequence. When episodes are viewed in a back-to-back manner, viewing these related episode content segments may become burdensome, impairing the media experience. For example, a user may not want to view a recap sequence describing a previous episode if that episode had previously been viewed only minutes earlier. Much of the related episode content, such as title sequences and opening or closing credit sequences may be repeated in each episode. It is inefficient to view these repeated segments. What is needed is a method to provide an episode without related episode content so that the user can have an improved media experience.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In aspects of the disclosure, related episode content of an episode in a series is provided. In an embodiment, related episode content may include a recap sequence, a title sequence, an opening credit sequence, a trailer, closing credit sequence or an advertisement. Accordingly, aspects of the disclosure provide for determining a relationship between a requested episode and a previously requested or viewed episode and providing related episode content, depending on the relationship. In an embodiment, the relationship may include an elapsed time between the episode request and the time the previous episode was requested or viewed. In some embodiments, the relationship may include the number of episodes in the series between the requested episode and the previously requested or viewed episode. In some embodiments, related episode content may be modified to remove portions previously viewed by a user, depending on one or more factors, such as an elapsed time and a user preference.

In an exemplary embodiment, a user preference may be learned, based on the user's past behavior. The user preference may comprise a property of the series, such as a category of the series or a title of the series.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
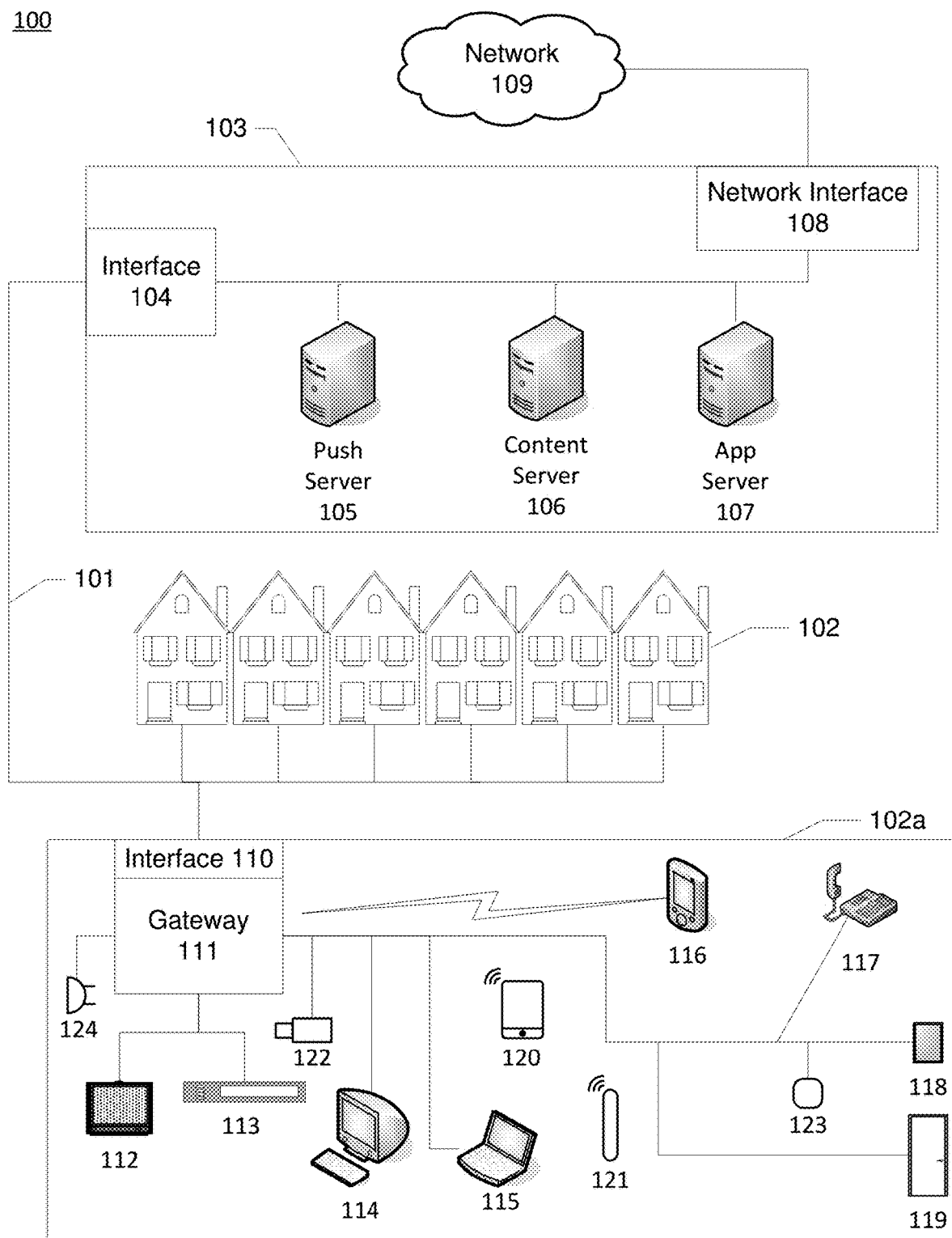
FIG. 1 illustrates an example information access and distribution network in accordance with one or more aspects as described herein.

FIG. 1 illustrates an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user media habits and collecting that information for use in selecting advertisements. Another application server may be responsible for formatting and inserting advertisements in a video stream and/or content item being transmitted to the premises 102. It should be understood by those skilled in the art that the same application server may be responsible for one or more of the above listed responsibilities.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
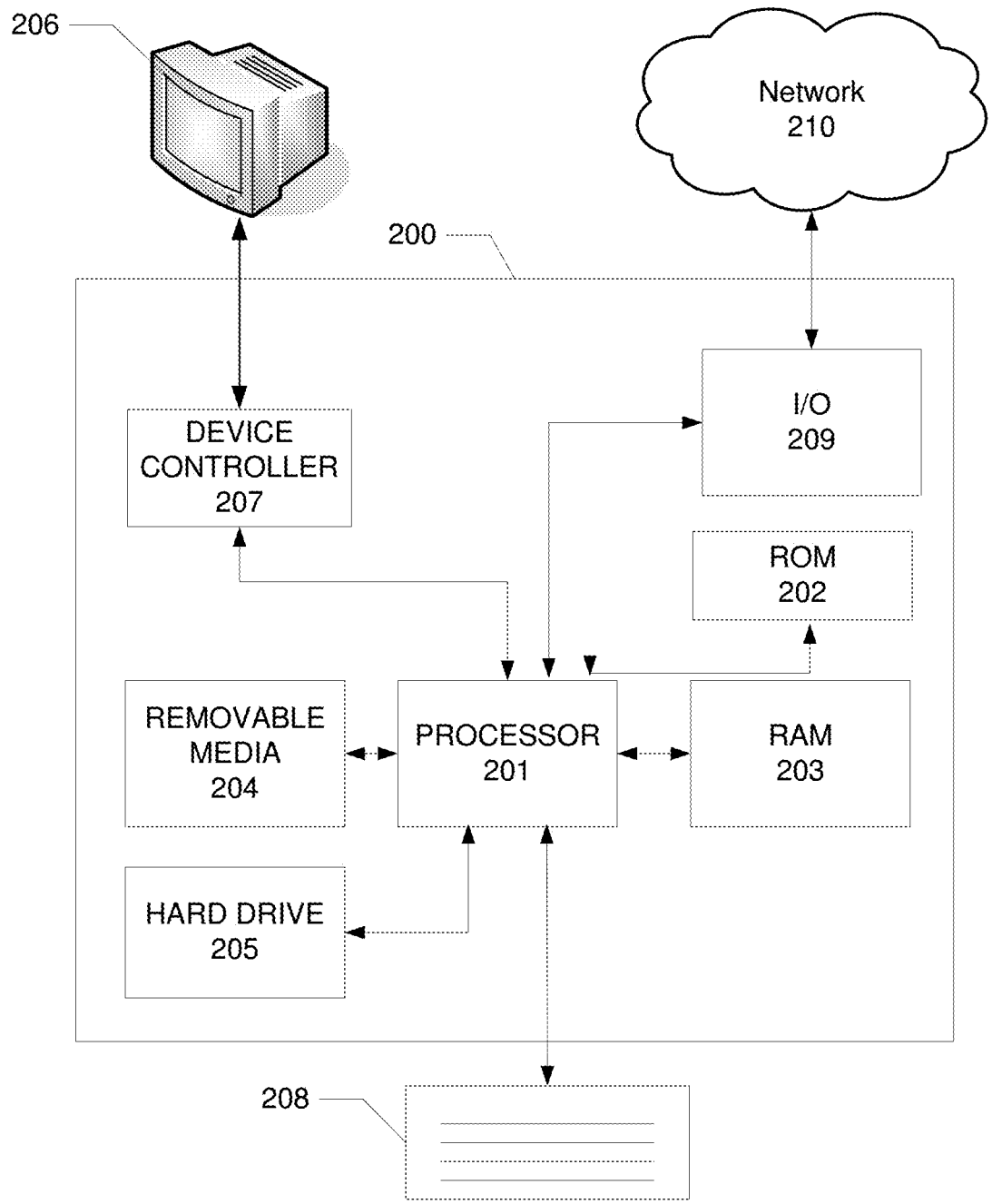
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
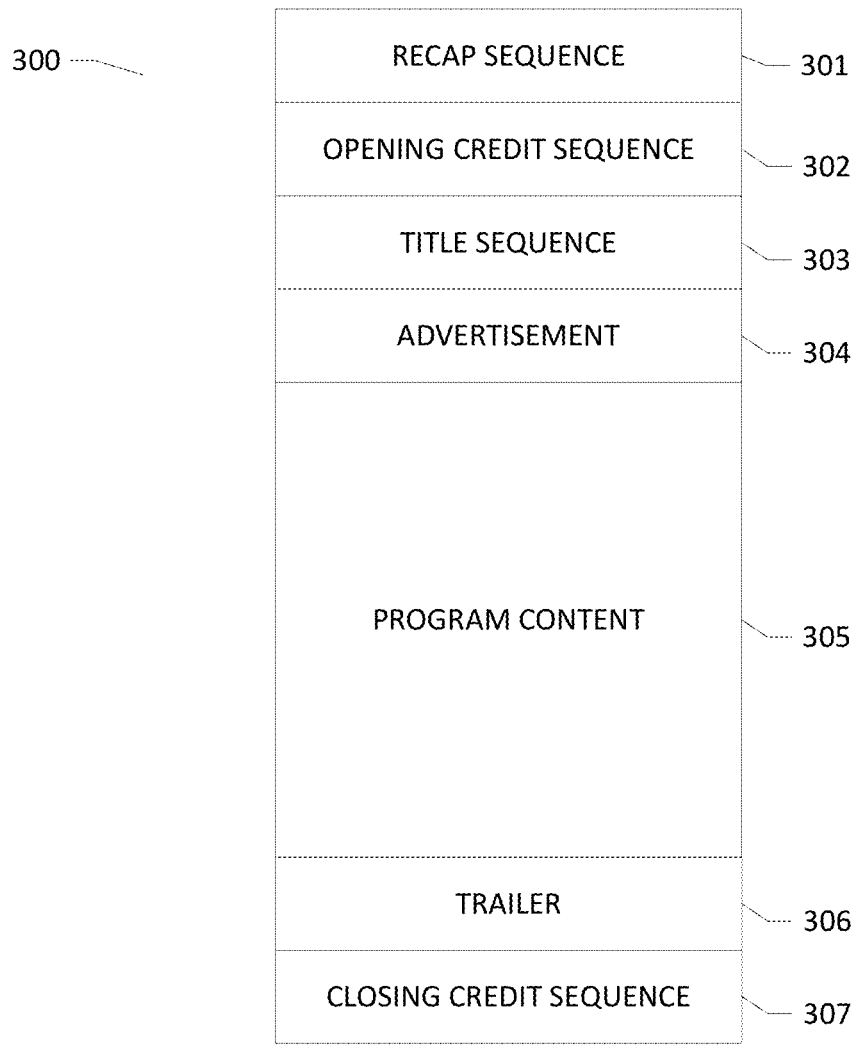
FIG. 3 illustrates an example episode with related content in accordance with one or more aspects as described herein.

FIG. 3 illustrates an example episode with related episode content in accordance with one or more aspects as described herein. An episode may be a program in a series. One or more episodes may be stored in a gateway interface device 111, a set-top box 113, a computing device 200 or a content server 106, for example. As shown in FIG. 3, and described in more detail below, an episode 300 may be comprised of several segments, i.e. audio, video, etc., including a recap sequence 301, an opening credit sequence 302, a title sequence 303, an advertisement 304, program content 305, a trailer 306 and a closing credit sequence 307. As disclosed above, related episode content may include segments other than the program content segment. The relative size of the segments in the example episode illustrated in FIG. 3 may not be shown to scale. Although FIG. 3 depicts one each of several types of episode content, it should be understood that more than one of each type may be present in some episodes. These and other types of episode content may occur in any order and may be repeated within an episode.

As shown in the example in FIG. 3, a recap sequence may be viewed, or listened to, first, followed by the opening credit sequence, which may in turn be followed by the title sequence, an advertisement and then the program content. The program content may be followed by a trailer, which may be followed by a closing credit sequence. It should be understood that the order of the segments may be different in various series or episodes, for example, the opening credit sequence 302 may be placed before the recap sequence 301. Similarly, the title sequence 303 may be placed before the opening credit sequence 302, etc. Additionally, one or more of the listed segment types may be omitted or combined with another segment. FIG. 3 depicts several of the segments that are found, for example, associated with episodes in a television series. Each segment in an episode may be identified or located through use of meta-data, for example, which may be associated with each segment. Continuing this example, meta-data might contain a label, such as "title sequence" or "opening credit sequence" to identify the segment so that it can be located. In some embodiments, the segment order may be pre-configured such that it would be known ahead of time and each segment would, in that example, not need meta-data in order to be identified. In other embodiments, a comparison of audio and/or video tracks between two or more episodes may be conducted to identify duplicate segments among episodes. In some embodiments, one or more duplicate segments may be determined to be related episode content.

Referring again to FIG. 3, the recap sequence 301 may be known by other names, such as "highlights" or "introduction" or "flashback." Continuing the television series example, an episode may contain a recap sequence 301 as a means to inform a user about what took place in previous episodes. In such examples, the recap sequence may contain video frames, audio and/or images from previous episodes. In some examples, the recap sequence, when viewed, may be introduced by a voice-over such as "Previously on . . . " or "Last time on . . . ." The recap sequence helps the user to catch up with the episode's position in a storyline, for example, and may be useful to the user if the user has not viewed the previous episode for a long period of time. When viewed, a recap sequence 301 may be lengthy such that a viewer may not want to view some or all of it. The length of a recap sequence 301 may vary, depending on the episode or series, for example. Some episodes may include multiple recap sequences. Recap sequences may occur in various places within an episode, for example, to introduce various episode segments.

Following the recap sequence 301, in the illustrative example of FIG. 3, is an opening credit sequence 302. The opening credit sequence 302 may contain a listing of starring actors and guest actors in the episode, the name of the studio, the name of the production company, persons in charge of casting, editing, production design, the name of the director of photography, the producers, the creator, writer, and director. The opening credit sequence may be presented as text displayed on a black background, for example. The length of the opening credit sequence 302 may vary, depending on the episode or series, for example.

Following the opening credit sequence 302 may be a title sequence 303. The title sequence is more often associated with a series, rather than an episode, and may be unchanged for each episode. A title sequence 303 typically includes music and visual imagery which may introduce a user to the series and often includes a typographic logo for a series. The duration of a title sequence 303 often varies depending on the series. In some examples, information that might normally presented in an opening credit sequence may be displayed during the title sequence 303 and the opening credit sequence might be omitted, in these cases.

An advertisement 304 may be placed in an episode following the title sequence 303. An example of an advertisement 304 is a television commercial. There may be multiple advertisements 304 following the title sequence 303. It should be understood that advertisements may also be found in other locations within an episode.

Referring again to FIG. 3, the program content 305 may contain the contents of the episode. This segment of the episode may be known as the "show" and it may be considered a primary part of the episode. It may be the part of the episode that the user particularly wants to view. This segment typically has different content for each episode.

A trailer 306 may occur within an episode, for example after the program content 305. The trailer 306 may be used to convey to the user some information about the next episode in the series. For example, the trailer 306 may depict the star of the series in a dangerous situation thereby encouraging the user to tune in next week, for example in a weekly run series, to see what happens. The trailer, when viewed, may present a voice over such as "Next week on . . . ," for example.

A closing credit sequence 307, which may be the last segment in an episode, may include an extensive list of the cast and crew members involved in production of the episode or series. The closing credit sequence 307 may list the title and composer for any music used in the episode, for example.

As should be understood from the description of FIG. 3, an episode may have a number of related content segments, some of which may have content unchanged among the episodes in a series. Other related content segments (for example, the recap sequence) may be different in each episode, but may not be useful to a user who may have recently viewed the episode or episodes being recapped.

Figure 4:
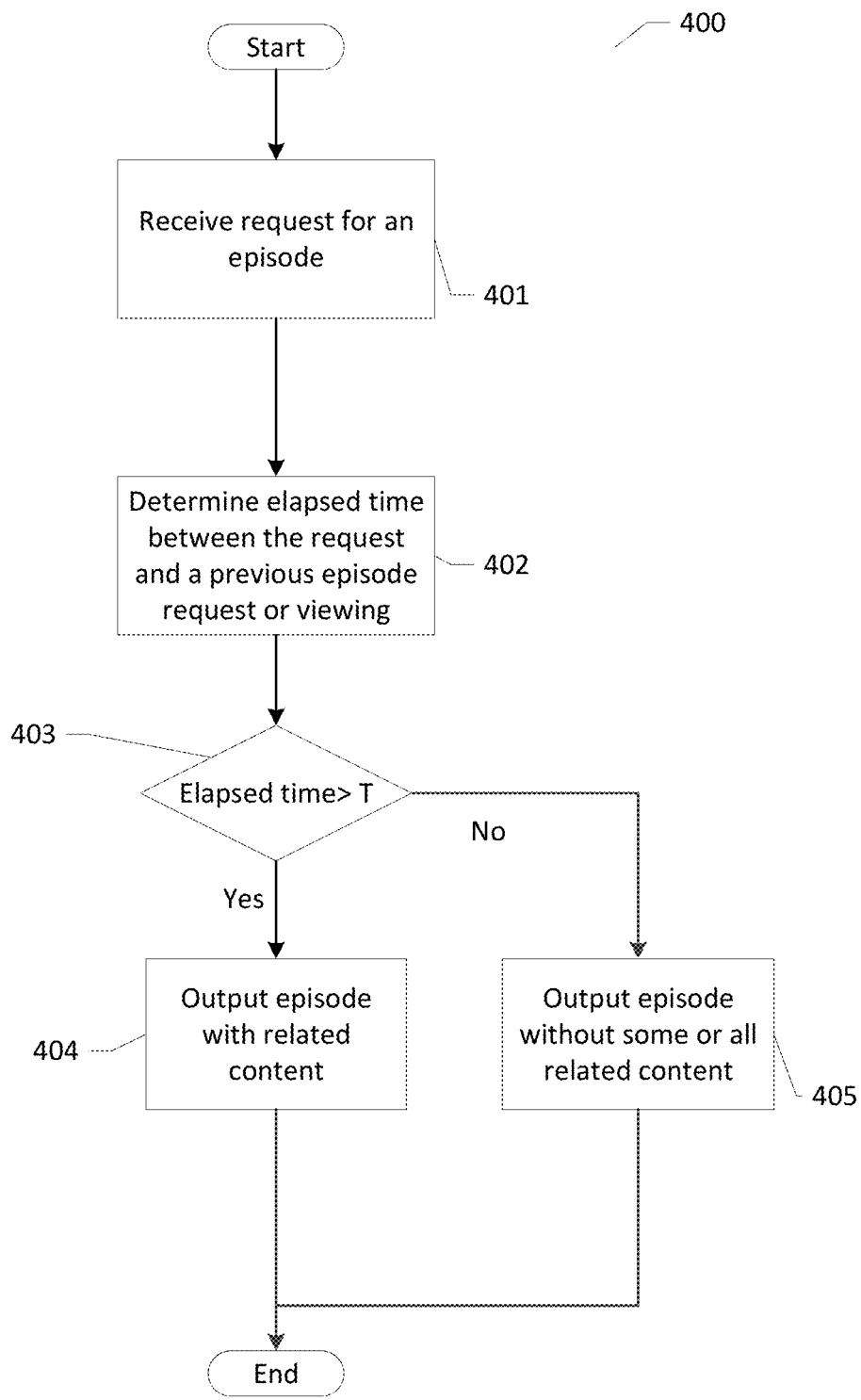
FIGS. 4-6 illustrate example flow charts for performing methods in accordance with one or more aspects as described herein.

FIG. 4 is an exemplary flow diagram illustrating an example method 400 in accordance with one or more disclosed features described herein. In one or more embodiments, the method illustrated in FIG. 4 and/or one or more steps thereof may be performed by one or more computing devices (e.g., gateway interface device 111, set-top box 113, computing device 200, content server 106, app server 107, and the like). In other embodiments, the method illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, method 400 may begin with step 401, in which a request may be received to provide an episode of a series. For example, the episode may be an episode of a series that is subsequent to an episode previously requested and/or viewed by the user. There are various ways to detect that a user has requested or viewed a previous episode. In some embodiments, content server 106 may track a user's request or viewing history. In other embodiments, gateway interface device 111 may track a user's request or viewing history. In some embodiments, information about whether a user has viewed a previous episode may be received from an external source, such as from a social media application or network. At step 402, a relationship may be determined between the episode requested in step 401 and an episode previously requested and/or viewed by the user. In the example shown in method 400, the relationship is the elapsed time between receiving the request in step 401 and the time that the user requested or viewed a previous episode. In some embodiments, the relationship may include information about whether the episode requested in step 401 is the next episode in the series after the episode previously requested and/or viewed by the user.

At step 403, in the example given, it may be determined whether the elapsed time is greater than a selected value "T." As an example, the selected value may be a number of hours, such as 24 hours or 48 hours. The selected value may be a default value or it may be configured, for example, by the user through use of one or more user input devices 208. The selected value may alternatively be expressed in other ways, such as in days, weeks, months or minutes. If it is determined at step 403 that the elapsed time is greater than the selected value, then method 400 may continue to step 404. If it is determined at step 403 that the elapsed time is not greater than the selected value, then method 400 may continue to step 405.

At step 404, the requested episode may be output with the related content. For example, the episode may be provided to a user with related episode content, such as a recap sequence or a title sequence.

At step 405, the episode may be provided or output without some or all of the related episode content. The amount of excluded content may depend on one or more variables, such as a user preference, an elapsed time since the user requested or viewed a previous episode, the user's viewing history, whether the segments in the related content include content previously viewed by the user, the title of the series and the type of series, among others. In some embodiments, the episode may be provided without any of the related episode content segments. For example, the episode may be provided without the recap sequence 301, the opening credit sequence 302, the title sequence 303, the advertisement 304, the trailer 306 and/or the closing credit sequence 307. In other embodiments, the episode may be provided without particular related content segments, for example, an episode may be provided without opening and closing credit sequences. In some embodiments, the related content may be provided in an abbreviated form, for example, the related content may be provided in a fast play mode, such as a fast forward mode or may be skipped entirely.

In some embodiments, a portion of a recap sequence may be removed, based on a user's viewing history or other factors. For example, as described above, a recap sequence may contain frames or portions of one or more previous episodes. If a user has recently viewed one or more of the previous episodes from which frames or portions are included in the recap sequence, the user may prefer not to view these portions of the recap sequence. In some embodiments, these portions of the recap sequence may be removed or not provided in a recap sequence output to the user.

There are various ways to detect that a portion of a recap sequence has been previously requested or viewed by a user. In some embodiments, one or more frames of the recap sequence may have an identifier, for example, such as an episode title, providing information identifying the episode from which it came. In some embodiments, frames of an episode may include meta-data or other identifying information which can be compared to frames of the recap sequence to detect an occurrence of that portion of the episode in the recap sequence. In some embodiments, a comparison of audio or images may be performed to detect an occurrence of a portion of the episode in the recap sequence. In some embodiments, portions of the recap sequence may be removed if it is determined that the user has viewed the previous episode from which the portion was taken. In some embodiments, removal may depend on an elapsed time since the user requested of viewed the episode from which the content came. For example, if the user had recently watched the episode from which the portion of the recap sequence came, then that portion of the recap sequence may be removed, so that the user is not presented with this portion again. In some embodiments, portions of the recap sequence may be removed if the user has previously requested or viewed another recap sequence containing those portions. In some embodiments, various settings related to the removal of portions of the recap sequence may be configurable.

In some example embodiments, a user may request to view another episode, in which case method 400 may continue at step 401.

In some embodiments, even though the method may progress via step 405, a user may request, for example, through use of one or more user input devices 208, such as a remote control, to view the related episode content. As an example, at step 405, a user may perform a backup or rewind command on a remote control in order to request that the related episode content be provided.

In some embodiments, the relationship at step 402 may include information about whether the episode requested in step 401 is the next episode in the series after the episode previously requested and/or viewed by a user. Continuing with such an embodiment, at step 403, it may be determined whether the requested episode is the next episode in the series. If it is determined at step 403 that the episode is the not the next episode in the series, then method 400 may continue to step 404. If it is determined at step 403 that the episode requested is the next episode in the series, then method 400 may continue to step 405. There are various methods that may be used to determine the position of an episode in a series. For example, television episodes may be assigned an episode code, or a production code, by the studio producing the series. This code typically contains a designator for the season and an episode number, which may be incremented for each episode produced. In an exemplary embodiment, if it is determined at step 403 that the requested episode is the next episode in the series, the episode may be output without related episode content. It should be understood that in some embodiments providing or outputting without related content may include providing without a subset of the related episode content.

Figure 5:
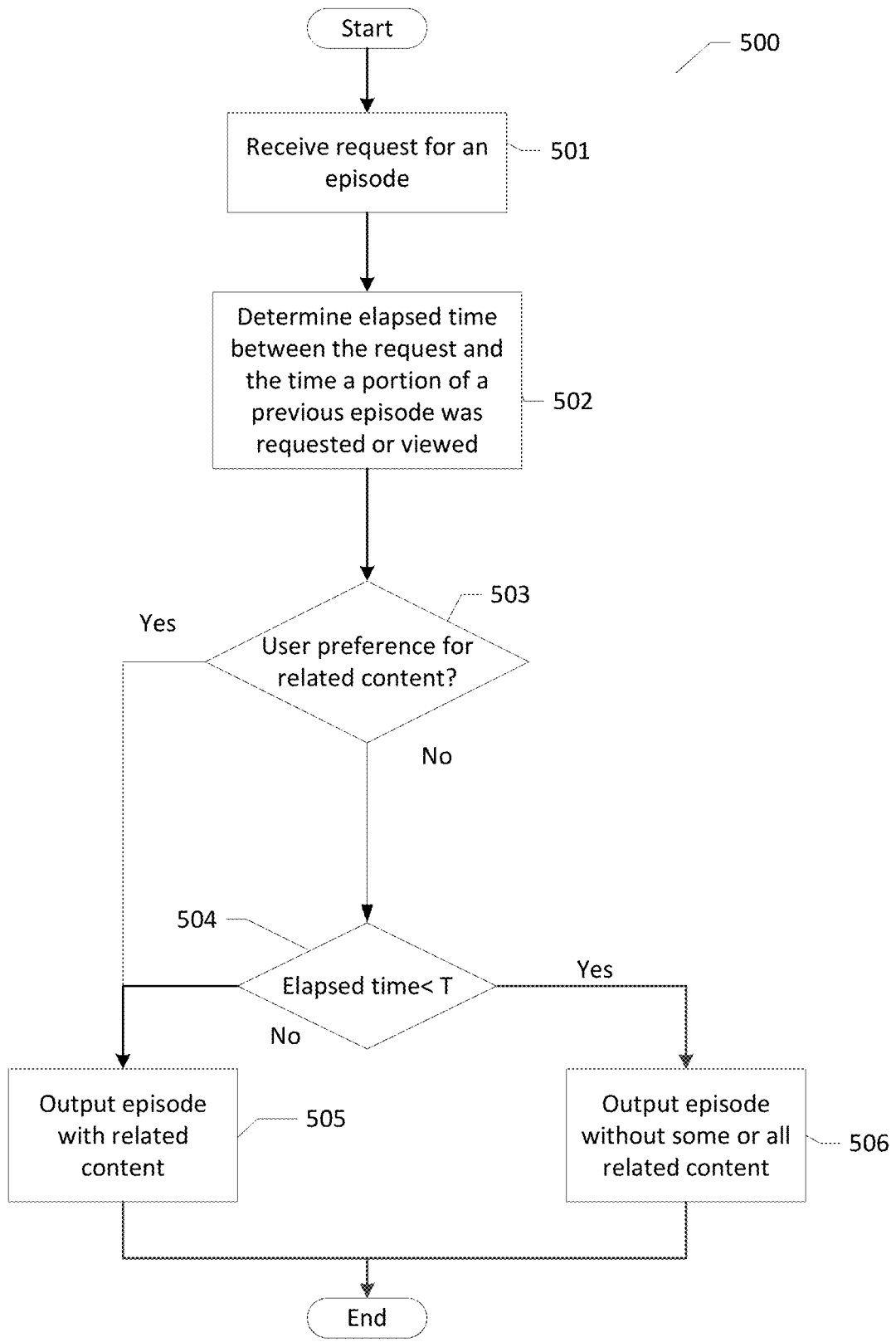

FIG. 5 is an exemplary flow diagram illustrating an example method 500 in accordance with one or more disclosed features described herein. In one or more embodiments, the method illustrated in FIG. 5 and/or one or more steps thereof may be performed by one or more computing devices (e.g., gateway interface device 111, set-top box 113, computing device 200, content server 106, app server 107, and the like). In other embodiments, the method illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 501, a request may be received to provide an episode of a series. For example, the episode may be an episode in a series that is subsequent to an episode previously requested and/or viewed by the user. As described above, the position of an episode in a series may be determined, for example, by referring to meta-data associated with an episode which may contain a production code or episode code containing a sequential episode number.

At step 502 the elapsed time between the request and the time a portion of a previous episode was previously requested and/or viewed by the user may be determined.

At step 503, a user preference may be determined. The user preference may include information about whether the user prefers to view related episode content. In some embodiments, the user preference may include information about a subset of related episode content the user may prefer to view. In some embodiments, the user preference may be pre-configured. In some embodiments, the user preference may be learned, based on a past behavior of the user. For example, a user's viewing history may be analyzed to determine which segments the user often skips over or fast forwards through, or which segments a user watches multiple times. Similarly, it can be determined whether the user watches the recap sequence to an episode. After patterns in user behavior are learned, the user preference may be updated automatically. In some embodiments, the user may be able to modify the user preferences, including the learned user preferences, for example, through use of one or more user input devices 208, such as a remote control. In some embodiments, the user preference may include information about the user's preference for viewing related episode content for a particular category of episode, including such categories as sports, sitcom, drama or action, for example. In some embodiments, the user preference may include information about the user's preference for viewing related episode content for a particular episode series, for example, by title of the series. In the example illustrated, at step 503, it may be determined whether or not the user prefers episodes to be delivered with related episode content. If the decision at step 503 is that the episode should be provided with related content, step 505 may include outputting the episode with the related content. If the user preference is for episodes to be delivered without related episode content, the method may continue to step 504.

At step 504, it may be determined whether the elapsed time is less than a selected value "T." As an example, the selected value may be a number of hours, such as 24 hours or 48 hours. The elapsed time may alternatively be expressed in other ways, such as in days, weeks, months or minutes. If it is determined at step 504 that the elapsed time is not less than the selected value, then method 500 may continue to step 505, where the episode may be provided with related episode content. If it is determined at step 504 that the elapsed time is less than the selected value, then method 500 may continue to step 506.

At step 506, the episode may be provided or output without some or all of the related episode content. The amount of excluded content may depend on the embodiment. In some embodiments, the episode may be provided without any of the related episode content segments. For example, the episode may be provided without the recap sequence 301, the opening credit sequence 302, the title sequence 303, the advertisement 304, the trailer 306 and the closing credit sequence 307. In other embodiments, the episode may be provided without particular related episode content segments, for example, an episode may be provided without opening and closing credit sequences.

In some example embodiments, a user may request to view another episode, in which case the method may continue at step 501.

Figure 6:
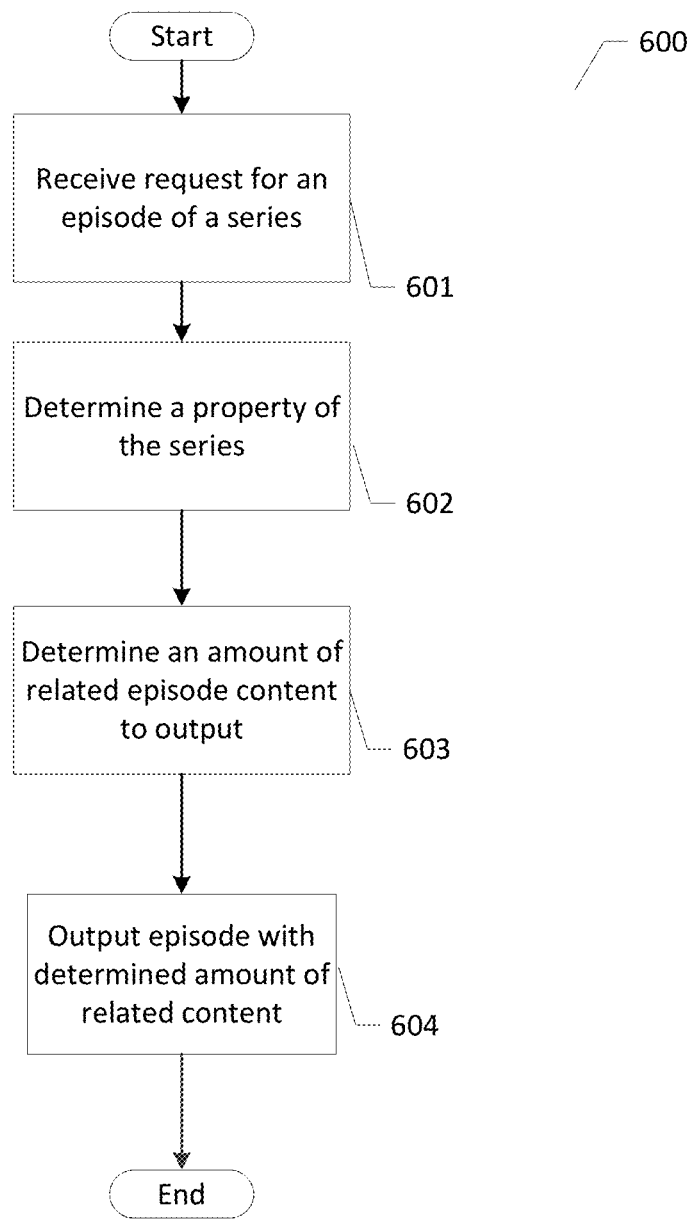

FIG. 6 is an exemplary flow diagram illustrating an example method 600 in accordance with one or more disclosed features described herein. In one or more embodiments, the method illustrated in FIG. 6 and/or one or more steps thereof may be performed by one or more computing devices (e.g., gateway interface device 111, set-top box 113, computing device 200, content server 106, app server 107, and the like). In other embodiments, the method illustrated in FIG. 6 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 601, a request for an episode may be received. For example, the episode may be an episode in a series that is subsequent to an episode previously requested and/or viewed by the user. This request may be initiated by a user, for example, through use of one or more user input devices 208, such as a remote control.

At step 602, a property of the episode may be determined. In some embodiments, the property may correspond to the title of the series that the episode relates to. In other embodiments, the property may relate to a category of the content type of the episode. For example, episode categories may include categories such as sports, sitcom, drama or action, for example.

At step 603, it may be determined an amount of related episode content to output. In some embodiments, the amount of related episode content to output may be based on the user preference associated with the property. The user preference may include information about whether the user prefers to view related episode content. In some embodiments, the user preference may include information about a subset of related episode content the user may prefer to view. In some embodiments, the amount of related episode content to output may be based on the user preference for related episode content for a category of series or a title of a series. For example, a user may prefer to view sitcom episodes without related episode content. In another example, a user may prefer to view a particular series with a title sequence. In some embodiments, the amount of related episode content to output may be based on how much of a previous episode the user has viewed. For example, if a user has viewed all of a previous episode, then portions of the recap sequence related to that previous episode may be removed from the related episode content or otherwise not included in the amount of related episode content that is determined. In some embodiments, the amount of related episode content to output may be based on the elapsed time from when the user has viewed a previous episode.

Step 604 may include providing or outputting the episode with the related content. In step 604, in some embodiments, particular related episode content may be provided according to user preferences and/or other factors described throughout the description herein. For example, if the user preference information provides that the recap sequence should be provided, but the opening and closing credit sequences should not be provided, then in step 604, the episode may be provided with the recap sequence while the opening and closing credit sequences may not be provided.

In some embodiments, decisions as to whether a user may be provided related episode content may be based on other factors. For example, factors such as the number of prior episodes of a season or series a user has viewed, content of episodes that were viewed or missed, the elapsed time since an episode from which recap content originated was previously viewed, the location of the device used for viewing an episode, the time of day, the type of device being used for viewing an episode or an engagement level of the user when viewing an episode. In some embodiments, a measure of user engagement may be determined based on how often the user has paused the presentation of an episode or has fast forwarded through scenes. In some embodiments, a user's engagement may be determined by use of eye tracking or by monitoring the ambient noise or conversation level. In some embodiments, a context necessity factor may be determined, providing an indication of a user's expected need for episode context information, based on these factors, among others, and used in decisions as to whether a user may be provided related episode content.

In some embodiments, a user may be provided with an indication of a related episode content providing mode. In some embodiments, the indication may include a visual indication of a current mode or an indication of an upcoming content adaptation. For example, a visual indication may be provided to inform the user that the next recap sequence will be omitted. In some embodiments, user input may be accepted to override the current mode or the upcoming content adaptation.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
receiving, by a computing device and from a user device associated with a user, a request for an episode of a series, wherein the episode is associated with a recap sequence comprising portions of a plurality of previous episodes of the series;
causing output of an indication that the recap sequence is modified; and
causing, after output of the indication, output of the modified recap sequence with the episode of the series, wherein the modified recap sequence:
comprises one or more portions of the recap sequence, wherein the one or more portions are selected based on determining, for each portion of the recap sequence, whether an episode associated with the portion satisfies a recency threshold.

2. The method of claim 1, wherein the recency threshold is satisfied by an episode associated with the portion being output within a threshold amount of time prior to receiving the request for the episode.

3. The method of claim 1, wherein the recency threshold is satisfied by an episode associated with the portion being output within a threshold quantity of episodes of the series prior to receiving the request for the episode.

4. The method of claim 1, wherein the modified recap sequence excludes one or more portions of the recap sequence based on a determination that one or more episodes associated with the excluded one or more portions exceed the recency threshold.

5. The method of claim 1, wherein the causing output of the modified recap sequence comprises causing, based on user preferences, one or more of:
output of an opening credits sequence, or
output of a title sequence.

6. The method of claim 1, wherein the causing output of the modified recap sequence comprises:
causing, before the output of the modified recap sequence and based on a determination that one or more second portions of the recap sequence exceed the recency threshold, the one or more second portions to be replaced with second content.

7. The method of claim 1, further comprising:
receiving, from the user device, a second request for the recap sequence; and
causing, based on receiving the second request, output of the recap sequence without modification.

8. The method of claim 1, wherein causing output of the modified recap sequence with the episode of the series comprises causing output of the modified recap sequence as a beginning of the episode of the series.

9. The method of claim 1, further comprising modifying, based on the output of the modified recap sequence with the episode of the series, a user preference corresponding to recap sequences.

10. The method of claim 1, wherein the causing output of the modified recap sequence is based on not receiving user input, after output of the indication, requesting the recap sequence without modification.

11. An apparatus comprising:
one or more processors; and
memory storing instructions that, when executed by the one or more processors, configure the apparatus to:
receive, from a user device associated with a user, a request for an episode of a series, wherein the episode is associated with a recap sequence comprising portions of a plurality of previous episodes of the series;
cause output of an indication that the recap sequence is modified; and
cause, after output of the indication, output of the modified recap sequence with the episode of the series, wherein the modified recap sequence:
comprises one or more portions of the recap sequence, wherein the one or more portions are selected based on determining, for each portion of the recap sequence, whether an episode associated with the portion satisfies a recency threshold.

12. The apparatus of claim 11, wherein the recency threshold is satisfied by an episode associated with the portion being output within a threshold amount of time prior to receiving the request for the episode.

13. The apparatus of claim 11, wherein the recency threshold is satisfied by an episode associated with the portion being output within a threshold quantity of episodes of the series prior to receiving the request for the episode.

14. The apparatus of claim 11, wherein the modified recap sequence excludes one or more portions of the recap sequence based on a determination that one or more episodes associated with the excluded one or more portions exceed the recency threshold.

15. The apparatus of claim 11, wherein the instructions, when executed by the one or more processors, further configure the apparatus to cause output of the modified recap sequence by causing, based on user preferences, one or more of:
output of an opening credits sequence, or
output of a title sequence.

16. The apparatus of claim 11, wherein the instructions, when executed by the one or more processors, configure the apparatus to cause output of the modified recap sequence by:
causing, before the output of the modified recap sequence and based on a determination that one or more second portions of the recap sequence exceed the recency threshold, the one or more second portions to be replaced with second content.

17. The apparatus of claim 11, wherein the instructions, when executed by the one or more processors, further configure the apparatus to:
receive, from the user device, a second request for the recap sequence; and
cause, based on receiving the second request, output of the recap sequence without modification.

18. A system comprising:
a first computing device; and
a second computing device, wherein the second computing device is a user device associated with a user,
wherein the first computing device is configured to:
receive, from the second computing device, a request for an episode of a series, wherein the episode is associated with a recap sequence comprising portions of a plurality of previous episodes of the series;
cause output of an indication that the recap sequence is modified; and
cause, after output of the indication, output of the modified recap sequence with the episode of the series, wherein the modified recap sequence:
comprises one or more portions of the recap sequence, wherein the one or more portions are selected based on determining, for each portion of the recap sequence, whether an episode associated with the portion satisfies a recency threshold, and
wherein the second computing device is configured to:
send the request for the episode of the series to the first computing device; and
output the modified recap sequence.

19. The system of claim 18, wherein the recency threshold is satisfied by an episode associated with the portion being output within a threshold amount of time prior to receiving the request for the episode.

20. The system of claim 18, wherein the recency threshold is satisfied by an episode associated with the portion being output within a threshold quantity of episodes of the series prior to receiving the request for the episode.

21. The system of claim 18, wherein the modified recap sequence excludes one or more portions of the recap sequence based on a determination that one or more episodes associated with the excluded one or more portions exceed the recency threshold.

22. The system of claim 18, wherein the first computing device is further configured to cause, based on user preferences, one or more of:
output of an opening credits sequence, or
output of a title sequence.

23. The system of claim 18, wherein the first computing device is configured to cause the output of the modified recap sequence by:
causing, before the output of the modified recap sequence and based on a determination that one or more second portions of the recap sequence exceed the recency threshold, the one or more second portions to be replaced with second content.

24. The system of claim 18, wherein the first computing device is further configured to:
receive, from the second computing device, a second request for the recap sequence; and
cause, based on receiving the second request, output of the recap sequence without modification.

25. One or more non-transitory computer readable medium storing instructions that, when executed, cause:
receiving, by a computing device and from a user device associated with a user, a request for an episode of a series, wherein the episode is associated with a recap sequence comprising portions of a plurality of previous episodes of the series;
causing output of an indication that the recap sequence is modified; and
causing, after output of the indication, output of the modified recap sequence with the episode of the series, wherein the modified recap sequence:
comprises one or more portions of the recap sequence, wherein the one or more portions are selected based on determining, for each portion of the recap sequence, whether an episode associated with the portion satisfies a recency threshold.

26. The one or more non-transitory computer readable medium of claim 25, wherein the recency threshold is satisfied by an episode associated with the portion being output within a threshold amount of time prior to receiving the request for the episode.

27. The one or more non-transitory computer readable medium of claim 25, wherein the recency threshold is satisfied by an episode associated with the portion being output within a threshold quantity of episodes of the series prior to receiving the request for the episode.

28. The one or more non-transitory computer readable medium of claim 25, wherein the modified recap sequence excludes one or more portions of the recap sequence based on a determination that one or more episodes associated with the excluded one or more portions exceed the recency threshold.

29. The one or more non-transitory computer readable medium of claim 25, wherein the instructions, when executed, cause the output of the modified recap sequence by causing, based on user preferences, one or more of:
output of an opening credits sequence, or
output of a title sequence.

30. The one or more non-transitory computer readable medium of claim 25, wherein the instructions, when executed, cause the output of the modified recap sequence by:
causing, before the output of the modified recap sequence and based on a determination that one or more second portions of the recap sequence exceed the recency threshold, the one or more second portions to be replaced with second content.

31. The one or more non-transitory computer readable medium of claim 25, wherein the instructions, when executed, further cause:
receiving, from the user device, a second request for the recap sequence; and
causing, based on receiving the second request, output of the recap sequence without modification.

* * * * *